(12) United States Patent
Hayashi et al.

(10) Patent No.: US 9,248,826 B2
(45) Date of Patent: Feb. 2, 2016

(54) VEHICLE POWER-GENERATOR DEVICE AND VEHICLE POWER-GENERATION CONTROL METHOD

(75) Inventors: Kensuke Hayashi, Chiyoda-ku (JP);
Shingo Yamaguchi, Chiyoda-ku (JP);
Keiichi Enoki, Chiyoda-ku (JP);
Toshiaki Date, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/376,311

(22) PCT Filed: Apr. 9, 2012

(86) PCT No.: PCT/JP2012/059673
§ 371 (c)(1),
(2), (4) Date: Aug. 1, 2014

(87) PCT Pub. No.: WO2013/153597
PCT Pub. Date: Oct. 17, 2013

(65) Prior Publication Data
US 2014/0379191 A1 Dec. 25, 2014

(51) Int. Cl.
*B60W 10/08* (2006.01)
*B60K 6/485* (2007.10)
*B60W 10/18* (2012.01)
*B60W 20/00* (2006.01)
*B60W 10/06* (2006.01)

(52) U.S. Cl.
CPC .............. *B60W 20/10* (2013.01); *B60K 6/485* (2013.01); *B60W 10/06* (2013.01); *B60W 10/08* (2013.01); *B60W 20/1062* (2013.01); *B60W 2510/0623* (2013.01); *B60W 2710/083* (2013.01);

(Continued)

(58) Field of Classification Search
CPC ...... B60K 6/485; B60W 10/08; B60W 10/06; B60W 20/1062; B60W 20/10; B60W 20/108; Y02T 10/6226
See application file for complete search history.

(56) References Cited

U.S. PATENT DOCUMENTS 6,335,573 B1 * 1/2002 Eguchi et al. ............... 290/40 C
6,369,531 B1 * 4/2002 Oshima et al. .............. 318/139
(Continued)

FOREIGN PATENT DOCUMENTS

JP 2004-120877 A 4/2004
JP 2010-187500 A 8/2010
(Continued)

OTHER PUBLICATIONS

International Search Report for PCT/JP2012/059673 dated Jul. 3, 2012.

*Primary Examiner* — Michael J Zanelli
(74) *Attorney, Agent, or Firm* — Sughrue Mion, PLLC; Richard C. Turner

(57) ABSTRACT

A control device (10) includes: target deceleration calculation means (101) for calculating a target deceleration by using a target deceleration map in which a target deceleration is set for each vehicle speed; command power-generation torque calculation means (102) for calculating a command power-generation torque based on the target deceleration, a rotation speed of a power generator (2), and a transmission gear ratio of a transmission (3); and command Duty calculation means (103) for calculating a command Duty based on the command power-generation torque, and the rotation speed and an output voltage of the power generator (2). The target deceleration map is calculated based on a vehicle-speed shift in accordance with actual running conditions when a vehicle is decelerating with fuel stop.

9 Claims, 14 Drawing Sheets

(52) U.S. Cl.
CPC .. *B60W2710/1044* (2013.01); *B60W 2720/106* (2013.01); *Y02T 10/6226* (2013.01); *Y10S 903/93* (2013.01)

(56) References Cited

U.S. PATENT DOCUMENTS 6,857,491 B2 * 2/2005 Wakashiro et al. ........ 180/65.26
7,231,284 B2 * 6/2007 Itoh et al. ........................ 701/22
2012/0130572 A1 * 5/2012 Fedewa ............................ 701/22
2013/0066492 A1 * 3/2013 Holmes et al. .................. 701/22

FOREIGN PATENT DOCUMENTS

| JP | 2011-66957 A | 3/2011 |
| WO | 2012/020469 A1 | 2/2012 |

* cited by examiner

VEHICLE POWER-GENERATOR DEVICE AND VEHICLE POWER-GENERATION CONTROL METHOD

CROSS REFERENCE TO RELATED APPLICATIONS

This application is a National Stage of International Application No. PCT/JP2012/059673 filed Apr. 9, 2012, the contents of which are incorporated herein by reference in their entirety.

TECHNICAL FIELD

The present invention relates to a vehicle power-generator device and a vehicle power-generation control method, in particular, to a vehicle power-generator device and a vehicle power-generation control method for increasing recovery efficiency for energy recovery of recovering kinetic energy as electric energy when a vehicle is decelerating so that fuel efficiency of the vehicle is improved.

BACKGROUND ART

In recent years, as a technology for reducing fuel consumption of a vehicle, there has been developed a vehicle which stops fuel injection and recovers kinetic energy of the vehicle as electric power by regenerative power generation in the case where there is no acceleration request by an operation of an accelerator pedal when the vehicle is decelerating. In such a vehicle, it is important to set a power-generation torque to an appropriate value so as to obtain a regenerative power-generation amount as large as possible while preventing deceleration feeling of the vehicle from being excessive at the time of regenerative power generation.

For example, in a related-art device disclosed in Patent Literature 1, it is described that a target deceleration (target negative acceleration) is set larger as a vehicle speed becomes higher. A power-generation amount of a power generator is controlled so that an actual deceleration (actual negative acceleration) becomes equal to the target deceleration. In this manner, maximum fuel efficiency improvement effects are intended to be achieved by recovery of deceleration energy by the regenerative power generation and setting of optimal fuel stop time.

CITATION LIST

Patent Literature

[PTL] JP 2004-120877 A

SUMMARY OF INVENTION

Technical Problem

In the related-art device disclosed in Patent Literature 1, in consideration of a running resistance with respect to the vehicle speed, the target deceleration is set larger as the vehicle speed becomes higher. However, a vehicle-speed shift while the vehicle is actually running is not uniform. Therefore, the target deceleration at which the fuel efficiency improvement effects are maximized cannot be always set.

Moreover, the regenerative power-generation amount under deceleration with the fuel stop increases as the target deceleration is set larger. On the other hand, however, there is a possibility that the vehicle speed becomes lower than a vehicle speed intended by a driver. In such a case, the driver performs an accelerator operation for re-acceleration, and hence the fuel stop is cancelled, while the regenerative power generation is terminated. As a result, the amount of used fuel increases.

FIG. 6 is a graph showing a relationship between the target deceleration at a specific vehicle speed and an estimated fuel reduction amount by the regenerative power generation. In FIG. 6, a horizontal axis indicates the target deceleration, whereas a vertical axis indicates the estimated fuel reduction amount. A solid line 60 indicates a shift of the estimated fuel reduction amount with respect to the target deceleration. As indicated by the solid line 60, a value of the estimated fuel reduction amount greatly differs for each target deceleration, and a change thereof is complex. Therefore, it is not easy to obtain the target deceleration at which a fuel reduction amount becomes maximum.

In FIG. 6, at a point 63, the estimated fuel reduction amount becomes maximum. In order to maximize a fuel reduction effect by the regenerative power generation, the target deceleration is required to be set to a value of the deceleration corresponding to the point 63. In the related-art device of Patent Literature 1, however, the target deceleration cannot always be set to the deceleration corresponding to the point 63 shown in FIG. 6.

The present invention has been made to solve the problem described above, and has an object to provide a vehicle power-generator device and a power-generation control method, which enable a calculation of a target deceleration at which an estimated fuel reduction amount becomes maximum so that an output of a power generator can be set based on the target deceleration to maximize a fuel reduction amount by regenerative power generation under deceleration with fuel stop, which can therefore improve fuel efficiency of the vehicle.

Solution to Problem

According to one embodiment of the present invention, there is provided a vehicle power-generator device to be mounted in a vehicle, the vehicle including: an internal combustion engine as a power source for the vehicle; a rotary electric machine for transmitting and receiving power to/from the internal combustion engine, the rotary electric machine being capable of variably controlling a power-generation amount by a command power-generation amount to be input to the rotary electric machine; and a transmission for transmitting the power of the internal combustion engine and the rotary electric machine to a drive shaft of the vehicle, the vehicle power-generator device including: rotation-speed detection means for detecting a rotation speed of the rotary electric machine; output-voltage acquisition means for detecting an output voltage of the rotary electric machine; transmission-gear-ratio detection means for detecting a transmission gear ratio of the transmission; vehicle-speed detection means for detecting a vehicle speed of the vehicle; and a control device for inputting the command power-generation amount to the rotary electric machine. The control device includes: target deceleration calculation means for calculating a target deceleration in accordance with the vehicle speed detected by the vehicle-speed detection means by using a target deceleration map in which the target deceleration is set for each vehicle; command power-generation torque calculation means for calculating a command power-generation torque based on the target deceleration calculated by the target deceleration calculation means, the rotation speed detected by the rotation-speed detection means, and the transmission gear ratio detected by the transmission-gear-ratio detection means; and command power-generation amount calculation means for calculating the command power-generation amount to be input to the rotary electric machine based on the command power-generation torque calculated by the command power-generation torque calculation means, the rotation speed detected by the rotation-speed detection means, and the output voltage detected by the output-voltage acquisition means. The target deceleration map is calculated based on a vehicle-speed shift in accordance with an actual running condition of the vehicle, the actual running condition being detected by the vehicle-speed detection means under deceleration with fuel stop for the vehicle.

Advantageous Effects of Invention

According to one embodiment of the present invention, there is provided the vehicle power-generator device to be mounted in the vehicle, the vehicle including: the internal combustion engine as the power source for the vehicle; the rotary electric machine for transmitting and receiving the power to/from the internal combustion engine, the rotary electric machine being capable of variably controlling the power-generation amount by the command power-generation amount to be input to the rotary electric machine; and the transmission for transmitting the power of the internal combustion engine and the rotary electric machine to the drive shaft of the vehicle, the vehicle power-generator device including: the rotation-speed detection means for detecting the rotation speed of the rotary electric machine; the output-voltage acquisition means for detecting the output voltage of the rotary electric machine; the transmission-gear-ratio detection means for detecting the transmission gear ratio of the transmission; the vehicle-speed detection means for detecting the vehicle speed of the vehicle; and the control device for inputting the command power-generation amount to the rotary electric machine. The control device includes: the target deceleration calculation means for calculating the target deceleration in accordance with the vehicle speed detected by the vehicle-speed detection means by using the target deceleration map in which the target deceleration is set for each vehicle; the command power-generation torque calculation means for calculating the command power-generation torque based on the target deceleration calculated by the target deceleration calculation means, the rotation speed detected by the rotation-speed detection means, and the transmission gear ratio detected by the transmission-gear-ratio detection means; and the command power-generation amount calculation means for calculating the command power-generation amount to be input to the rotary electric machine based on the command power-generation torque calculated by the command power-generation torque calculation means, the rotation speed detected by the rotation-speed detection means, and the output voltage detected by the output-voltage acquisition means. The target deceleration map is calculated based on the vehicle-speed shift in accordance with the actual running condition of the vehicle, the actual running condition being detected by the vehicle-speed detection means under deceleration with the fuel stop for the vehicle. Therefore, the target deceleration at which the estimated fuel reduction amount becomes maximum can be calculated so that the output of the power generator can be set based on the target deceleration to maximize the fuel reduction amount by the regenerative power generation under deceleration with the fuel stop, which can therefore improve the fuel efficiency of the vehicle.

DESCRIPTION OF EMBODIMENTS

First Embodiment

Figure 1:
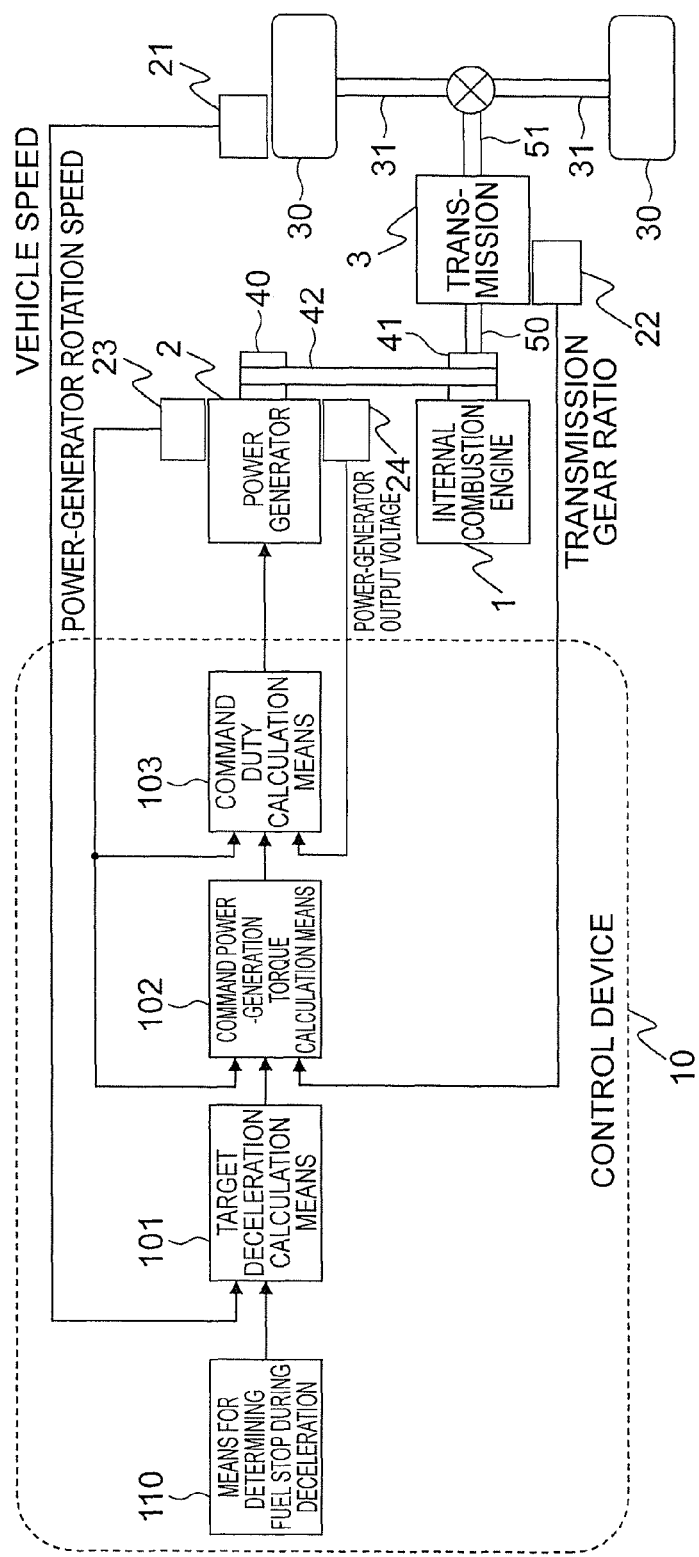
FIG. 1 is a configuration diagram of a vehicle including a vehicle power-generator device according to a first embodiment of the present invention.

FIG. 1 is a configuration diagram of a vehicle including a vehicle power-generator device according to a first embodiment of the present invention. As illustrated in FIG. 1, the vehicle includes an internal combustion engine 1 as a power source of the vehicle, a power generator (rotating electric machine) 2, and a transmission 3.

The vehicle also includes a plurality of wheels 30 and drive shafts 31 coupled to the wheels 30. A rotary shaft 40 is provided to the power generator 2, whereas a rotary shaft 41 is provided to the internal combustion engine 1. A belt 42 is looped around the rotary shafts 40 and 41. Moreover, the transmission 3 includes an input shaft 50 and an output shaft 51.

The vehicle power-generator device according to the first embodiment includes vehicle-speed detection means 21 for detecting a vehicle speed by using a vehicle-speed sensor or the like, transmission-gear-ratio detection means 22 for detecting a transmission gear ratio of the transmission 3, rotation-speed acquisition means 23 for acquiring a rotation speed of the power generator 2, and output-voltage acquisition means 24 for acquiring an output voltage of the power generator 2. The vehicle power-generator device according to the first embodiment also includes a control device 10.

The power generator 2 transmits and receives rotation power to/from the internal combustion engine 1 through an intermediation of the belt 42 which is looped around the rotary shafts 40 and 41. The transmission 3 performs transmission of power between the internal combustion engine 1 and the drive shafts 31 of the vehicle and between the power generator 2 and the drive shafts 31 of the vehicle. The power generator 2 can variably control a power-generation amount by a command Duty input from the control device 10.

The control device 10 includes means for determining fuel stop during deceleration, target deceleration calculation means 101, command power-generation torque calculation means 102, and command Duty calculation means 103. When determining that the vehicle is decelerating with fuel stop, the control device 10 calculates the command Duty and outputs the command Duty to the power generator 2.

Hereinafter, each of the means 110, and 101 to 103 included in the control device 10 is described.

Internal-combustion-engine control means (not shown) performs deceleration with the fuel stop based on vehicle-speed information and input of an operation of an accelerator pedal. The means for determining fuel stop during deceleration acquires information indicating whether or not the vehicle is decelerating with the fuel stop from the internal-combustion-engine control means.

When it is determined by the means 110 for determining fuel stop during deceleration that the vehicle is decelerating with the fuel stop, the target deceleration calculation means 101 uses a target deceleration map to calculate a target deceleration based on the vehicle speed input from the vehicle-speed detection means 21. The target deceleration map is calculated from a shift of the vehicle speed in accordance with actual running conditions of the vehicle based on the vehicle speed and a deceleration. Specifically, while the vehicle is decelerating with the fuel stop, based on the vehicle speed detected by the vehicle-speed detection means 21 and the deceleration obtained from the vehicle speed, the target deceleration map is calculated by calculating a deceleration distribution by adding up a frequency at which the predetermined deceleration is achieved for each vehicle speed, calculating an estimated fuel reduction amount based on the deceleration distribution, and then setting the deceleration at which the estimated fuel reduction amount becomes maximum as the target deceleration for each vehicle speed. A method of calculating the target deceleration map is described later.

The command power-generation torque calculation means 102 calculates a command power-generation torque based on the transmission gear ratio input from the transmission-gear-ratio acquisition means 22, the rotation speed of the power generator 2 input from the rotation-speed acquisition means 23, and the target deceleration input from the target deceleration calculation means 101.

The transmission-gear-ratio detection means 22 acquires the transmission gear ratio by employing, for example, a method of calculating a ratio of rotation speeds input from two rotation-speed sensors (not shown) which are respectively provided to the input shaft 50 and the output shaft 51 of the transmission 3.

The rotation-speed acquisition means 23 acquires the rotation speed of the power generator 2 by using, for example, a rotation-speed sensor (not shown) provided to the power generator 2.

The command Duty calculation means 103 calculates the command Duty based on the rotation speed of the power generator 2, which is input from the rotation-speed acquisition means 23, the output voltage of the power generator 2, which is input from the output-voltage acquisition means 24, and the command power-generation torque input from the command power-generation torque calculation means 102. The thus calculated command Duty is input to the power generator 2. In this manner, in the present invention, under deceleration with the fuel stop, the power-generation amount of the power generator 2 is set so as to achieve the target deceleration calculated by the target deceleration calculation means 101.

Figure 2:
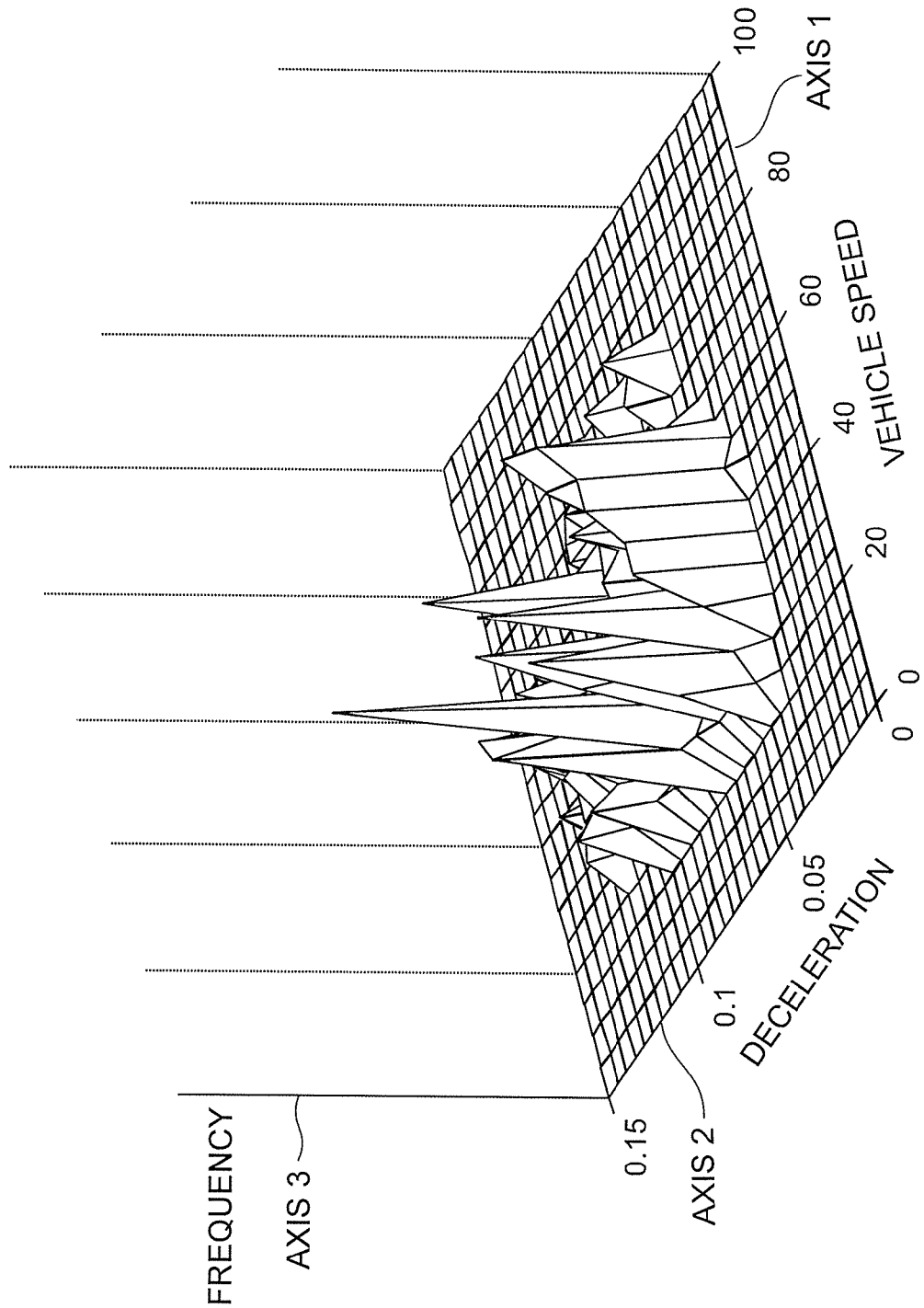
FIG. 2 is a deceleration distribution graph for describing a method of calculating a target deceleration map according to the first embodiment of the present invention, which is calculated from a vehicle-speed shift under deceleration with fuel stop for the vehicle.

FIG. 2 is a deceleration distribution graph which is used to calculate the target deceleration map used in the target deceleration calculation means 101. The deceleration is calculated from the vehicle-speed shift (change amount of the vehicle speed) under deceleration with the fuel stop of the vehicle. Specifically, the deceleration is obtained by differentiating the vehicle speed. In FIG. 2, an axis 1 indicates the vehicle speed, an axis 2 indicates the deceleration, and an axis 3 indicates a frequency at which the vehicle speed indicated by the axis 1 and the deceleration indicated by the axis 2 are achieved.

Figure 7:
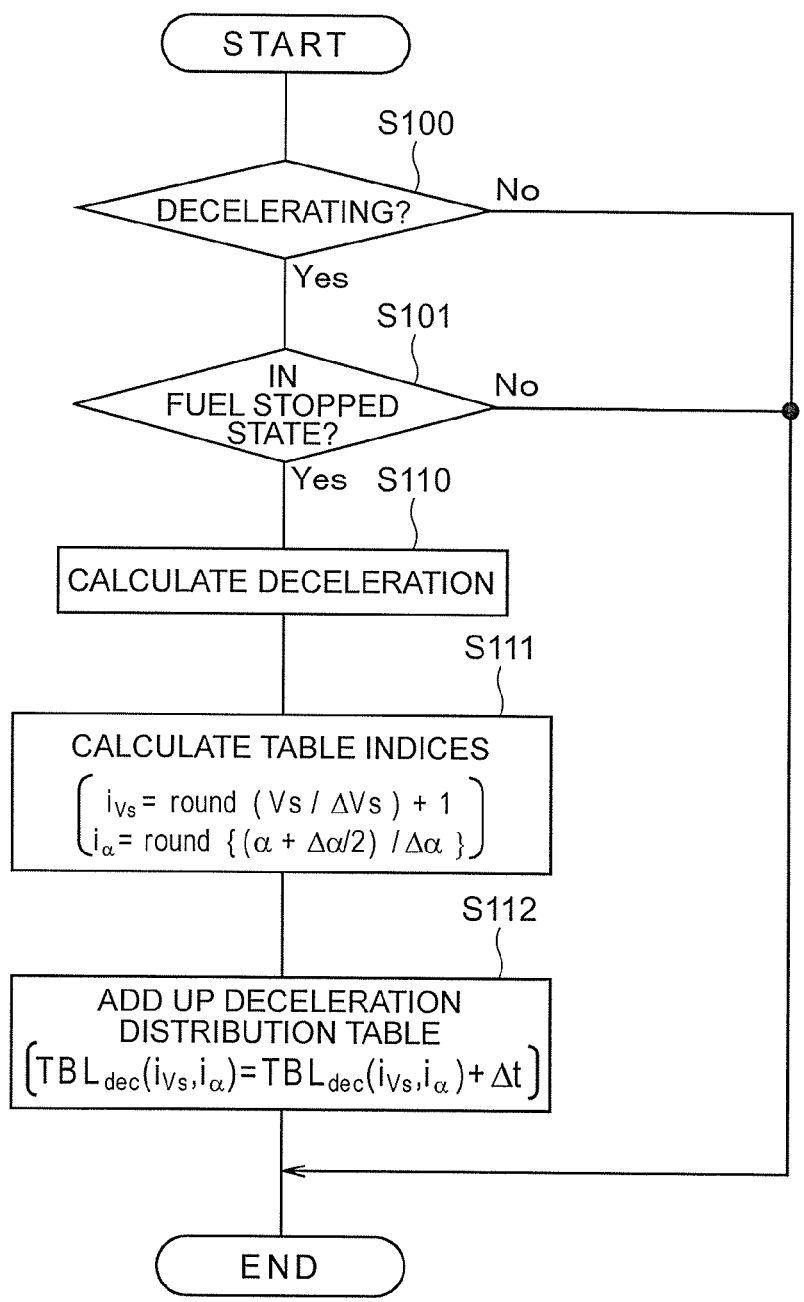
FIG. 7 is a flowchart illustrating processing for obtaining a deceleration distribution in the vehicle power-generator device according to the first embodiment of the present invention.

Hereinafter, processing for obtaining the deceleration distribution shown in FIG. 2 is described referring to FIG. 7. FIG. 7 is a flowchart illustrating processing for obtaining the deceleration distribution, which is executed by the target deceleration calculation means 101. The processing illustrated in FIG. 7 is repeatedly executed at predetermined time intervals Δt while the vehicle is running so that the deceleration distribution is calculated. In FIG. 7, first, in Step S100, it is determined based on a vehicle speed Vs whether or not the vehicle is decelerating. When the vehicle is decelerating, the processing proceeds to Step S101. When the vehicle is not decelerating, the processing is terminated. In Step S101, information indicating whether or not the fuel is in a stopped state for deceleration is acquired from the internal-combustion-engine control means (not shown). When the fuel is in the stopped state, the processing proceeds to Step S110. When the fuel is not in the stopped state, the processing is terminated. In Step S110, a deceleration α of the vehicle is calculated based on a change amount of the vehicle speed Vs for a predetermined time period. Then, the processing proceeds to Step S111. In Step S111, by using a deceleration distribution table $TBL_{dec}$ indicating a relationship between the vehicle speed Vs and the deceleration α, an index value indicating a corresponding element on the deceleration distribution table $TBL_{dec}$ of the vehicle speed Vs and the deceleration α is obtained. The deceleration distribution table TBL$_{dec}$ represents the deceleration distribution in the form of table, and has a vehicle-speed axis (see the axis 1 of FIG. 2) and a deceleration axis (see the axis 2 of FIG. 2). Each of the vehicle-speed axis and the deceleration axis is divided into predetermined class widths so as to define each class, as shown in FIG. 2. When an index indicating a class of the vehicle speed Vs is $i_{Vs}$ and an index indicating a class of the deceleration α is $i_\alpha$, these indices are respectively calculated by Expressions (1) and (2) described below. Then, the processing proceeds to Step S112.

$$i_{Vs} = \text{round}(Vs/\Delta Vs) + 1 \tag{1}$$

$$i_\alpha = \text{round}((\alpha + \Delta\alpha/2)/\Delta\alpha) \tag{2}$$

Here, ΔVs indicates a class width of the vehicle-speed axis of the deceleration distribution table TBL$_{dec}$, Δα indicates a class width of the deceleration axis of the deceleration distribution table TBL$_{dec}$, and round indicates a computation for rounding-off to the nearest whole number (rounding-off to the nearest integer). In Step S112, a value of the element of the deceleration distribution table TBL$_{dec}$, which is indicated by the indices obtained in Step S111, is added up as indicated by Expression (3) described below. Then, the processing is terminated.

$$\text{TBL}_{dec}(i_{Vs}, i_\alpha) = \text{TBL}_{dec}(i_{Vs}, i_\alpha) + \Delta t \tag{3}$$

Figure 3:
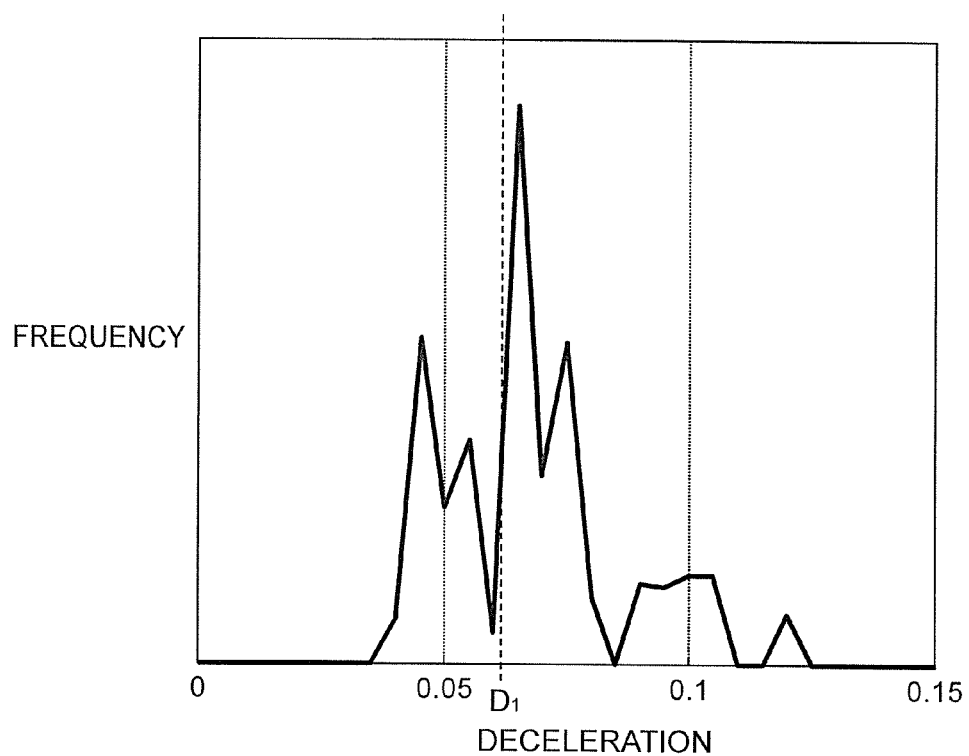
FIG. 3 is a deceleration distribution graph on a cross section taken at a vehicle speed Vs of the deceleration distribution graph of FIG. 2.

FIG. 3 is a sectional view showing a cross section obtained by taking the deceleration distribution graph shown in FIG. 2 at a specific vehicle speed Vs. A horizontal axis indicates the deceleration, whereas a vertical axis indicates a frequency at which each deceleration is achieved. For example, when the target deceleration is set to a predetermined value D$_1$ at the above-mentioned specific vehicle speed, the fuel is stopped at a time of deceleration while regenerative power generation can be performed in a region in which the deceleration is equal to or higher than the target deceleration D$_1$. In a region in which the deceleration is lower than the target deceleration D$_1$, the deceleration at the time of deceleration of the vehicle is larger than the deceleration intended by a driver. The driver thus performs a depressing operation on the accelerator for reacceleration, and the vehicle state returns from the fuel stopped state. In addition, the regenerative power generation cannot be performed. On the other hand, a regenerative power-generation amount for each time period (each time amount) in which the regenerative power generation can be performed becomes larger as a larger value is set to the target deceleration.

Figure 4:
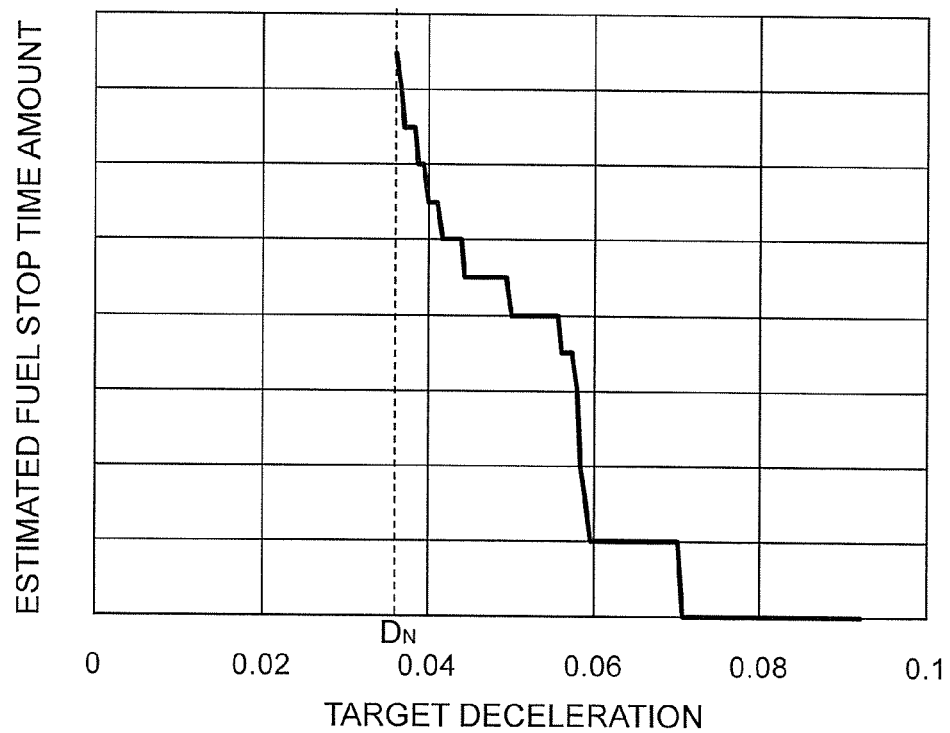
FIG. 4 is a graph showing an example of the result of calculation of an estimated fuel stop time amount, for describing the method of calculating the target deceleration map according to the first embodiment of the present invention.

FIG. 4 shows a relationship between a target deceleration α* and an estimated fuel stop time amount at the specific vehicle speed Vs. A horizontal axis indicates the target deceleration α*, whereas a vertical axis indicates the estimated fuel stop time amount $t_{FC}$(Vs, α*) corresponding to each target deceleration α*. In FIG. 4, a point D$_N$ indicates the deceleration in a no power-generation state at the vehicle speed Vs. The estimated fuel stop time amount $t_{FC}$(Vs, α*) corresponding to each target deceleration α* is obtained by integrating the frequency at which the deceleration is larger than the target deceleration α* on the deceleration distribution graph as shown in FIG. 3.

Figure 5:
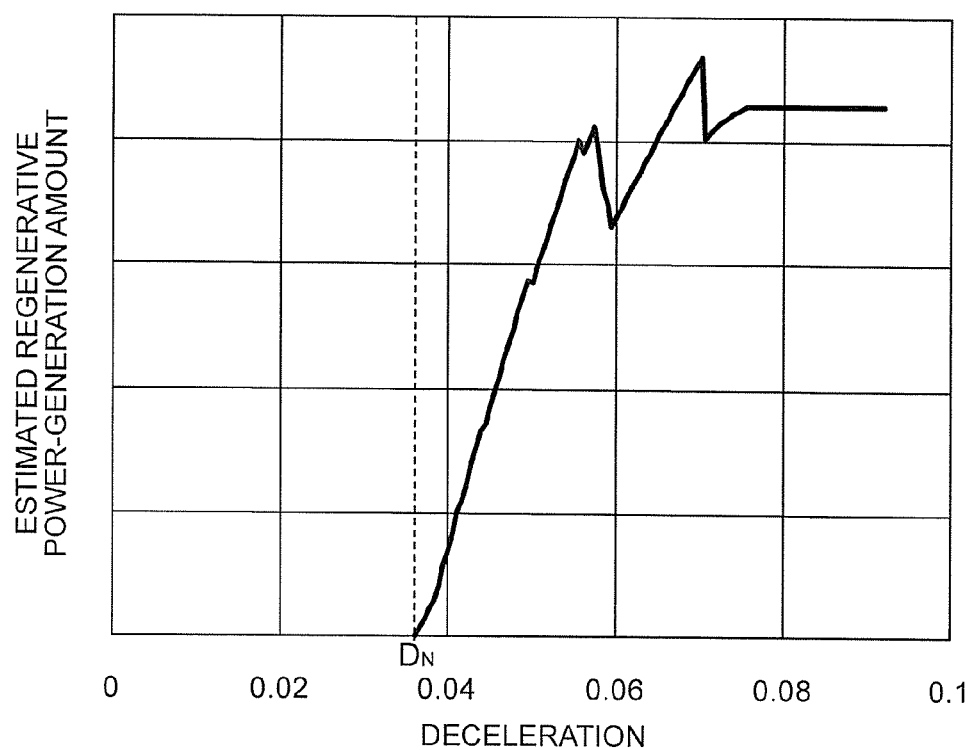
FIG. 5 is a graph showing an example of the result of calculation of an estimated regenerative power-generation amount, for describing the method of calculating the target deceleration map according to the first embodiment of the present invention.

FIG. 5 shows a relationship between the target deceleration α* and an estimated regenerative power-generation amount at the specific vehicle speed Vs. A horizontal axis indicates the target deceleration α*, whereas a vertical axis indicates an estimated regenerative power-generation amount P(Vs, α*) corresponding to each target deceleration α*. In FIG. 5, a point D$_N$ indicates the deceleration in the no power-generation state at the vehicle speed Vs. Hereinafter, how to obtain the estimated regenerative power-generation amount P(Vs, α*) at the target deceleration α* is described. First, a rotation speed N$_{ALT}$ of the power generator 2 at the vehicle speed Vs is calculated by Expression (4) described below, whereas a command torque T* to the power generator 2, which corresponds to the target deceleration α*, is calculated by Expression (5) described below.

$$N_{ALT} = Vs \times ((R_{TM} \times R_{FG} \times R_{PLY})/R_{TIRE}) \tag{4}$$

$$T^* = M \times (\alpha^* - \alpha_{dec}) \times (R_{TIRE}/(R_{TM} \times R_{FG} \times R_{PLY})) \tag{5}$$

Here, R$_{TIRE}$ indicates a tire diameter of each of the wheels 30, R$_{PLY}$ indicates a pulley ratio between the power generator 2 and the internal combustion engine 1, R$_{TM}$ indicates a transmission gear ratio of the transmission 3, R$_{FG}$ indicates a final reduction ratio, M indicates a weight of the vehicle. Moreover, $\alpha_{dec}$ indicates a deceleration D$_N$ when no power is generated. Note that, $\alpha_{dec}$ is obtained by measuring the vehicle-speed shift when a real vehicle is decelerating under inertia.

Figure 13:
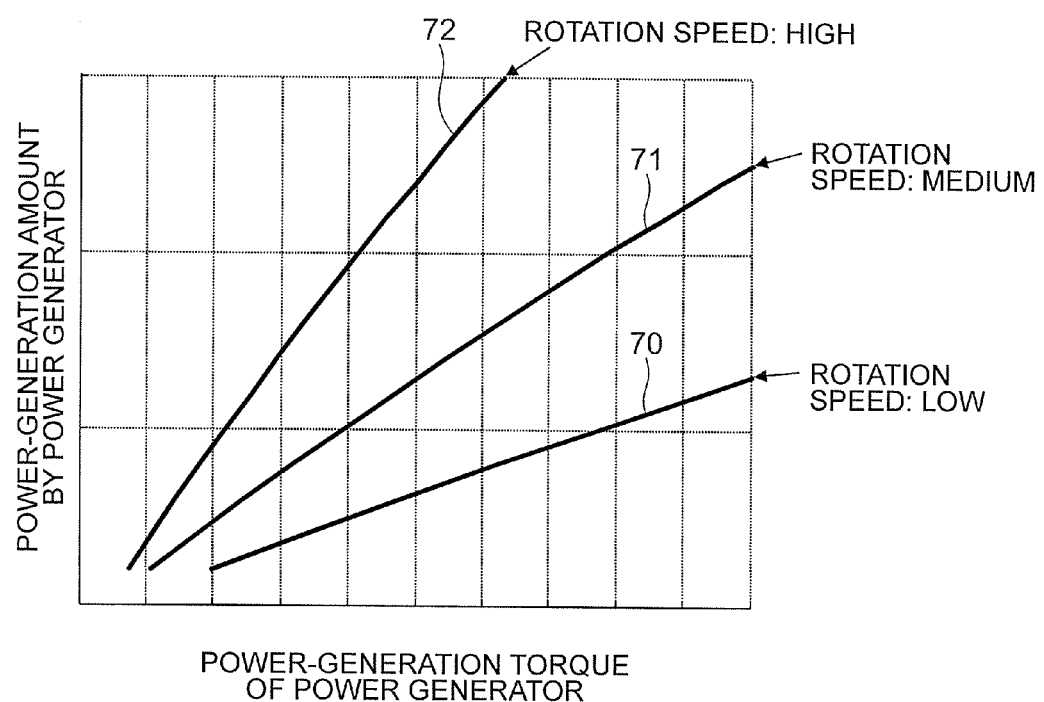
FIG. 13 is a map showing output characteristics of a power generator, for calculating a power-generation amount by the power generator.

Next, when the rotation speed of the power generator 2 is N$_{ALT}$ and the command torque to the power generator 2 is T*, the power-generation amount by the power generator 2 per unit time is obtained by referring to a characteristic map of the power generator 2 shown in FIG. 13. In FIG. 13, a horizontal axis indicates the power-generation torque (command torque) to the power generator 2, whereas a vertical axis indicates the power-generation amount by the power generator 2. In FIG. 13, for example, when the rotation speed is classified into three ranges, that is, low, medium, and high, a line 70 indicates a relationship between the power-generation torque and the power-generation amount when the rotation speed is low, a line 71 indicates a relationship between the power-generation torque and the power-generation amount when the rotation speed is medium, and a line 72 indicates a relationship between the power-generation torque and the power-generation amount when the rotation speed is high. First, by using the rotation speed and the power-generation torque, the power-generation amount by the power generator 2 per unit time is obtained from the characteristic map shown in FIG. 13. Next, the obtained power-generation amount by the power generator 2 per unit time is multiplied by a time amount in which the regenerative power generation can be performed, thereby calculating the estimated regenerative power-generation amount P (Vs, α*). The time amount in which the regenerative power generation can be performed is obtained by integrating a region in which the deceleration is larger than the target deceleration α* (point D$_1$) in FIG. 3. In the manner described above, the relationship between the target deceleration and the estimated regenerative power-generation amount as shown in FIG. 5 is obtained.

Next, by Expression (6) described below, an estimated fuel reduction amount ΔQf is calculated.

$$\Delta Qf = k_{FC} \times t_{FC}(Vs, \alpha^*) + k_p \times P(Vs, \alpha^*) \tag{6}$$

Here, k$_{FC}$ is a fuel stop time amount evaluation coefficient, which is a coefficient indicating an effect of the fuel stop time amount on the fuel reduction amount, and is predefined as, for example, a fuel consumption amount per unit time under no load. Moreover, k$_p$ is a power-generation amount evaluation coefficient, which is a coefficient indicating an effect of the regenerative power-generation amount on the fuel reduction amount, and is predefined as, for example, a value obtained by dividing an increased fuel amount due to the power generation by the power-generation amount at the time of power generation with fuel consumption.

Figure 6:
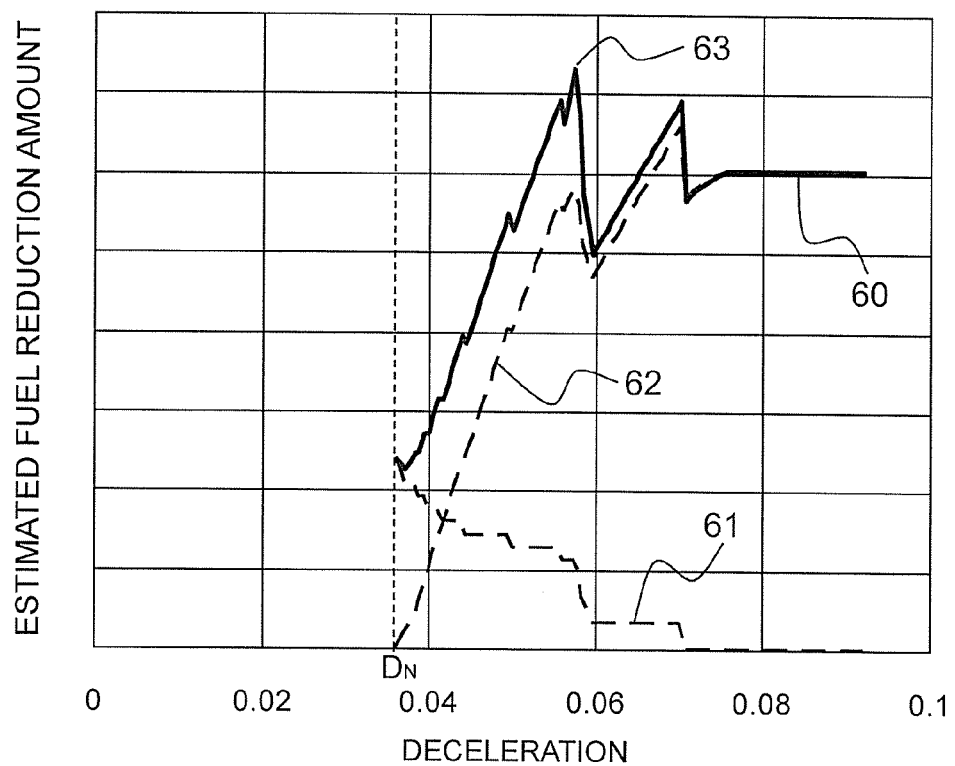
FIG. 6 is a graph showing an example of the result of calculation of an estimated fuel reduction amount, for describing the method of calculating the target deceleration map according to the first embodiment of the present invention.

In this manner, the estimated fuel reduction amount shown in FIG. 6 (indicated by a solid line 60) is calculated. FIG. 6 shows a relationship between the target deceleration α* and an estimated fuel reduction amount at the specific vehicle speed Vs. A horizontal axis indicates the target deceleration α*, whereas a vertical axis indicates the estimated fuel reduction amount corresponding to each target deceleration α*. In FIG. 6, a point $D_N$ indicates the deceleration in the no power-generation state at the vehicle speed Vs and the solid line 60 indicates the calculated estimated fuel reduction amount ΔQf. A dotted line 61 indicates the result of calculation of the estimated fuel reduction amount with the fuel stop time amount (that is, $k_{FC} \times t_{fc}(Vs, α^*)$), a dotted line 62 indicates the result of calculation of the estimated fuel reduction amount with the regenerative power-generation amount (that is, $k_P \times P(Vs, α^*)$), and a point 63 indicates a point at which the estimated fuel reduction amount ΔQf (solid line 60) becomes maximum.

Next, the target deceleration α* at which the estimated fuel reduction amount ΔQf becomes maximum is set to a target deceleration at the vehicle speed Vs. Specifically, in FIG. 6, the target deceleration is set as a value of the deceleration corresponding to the point 63.

In this manner, even for the other vehicle-speed regions, the target deceleration at which the estimated fuel reduction amount ΔQf becomes maximum is obtained similarly to the case as described above, thereby calculating the target deceleration map used in the target deceleration calculation means 101 illustrated in FIG. 1.

Figure 8:
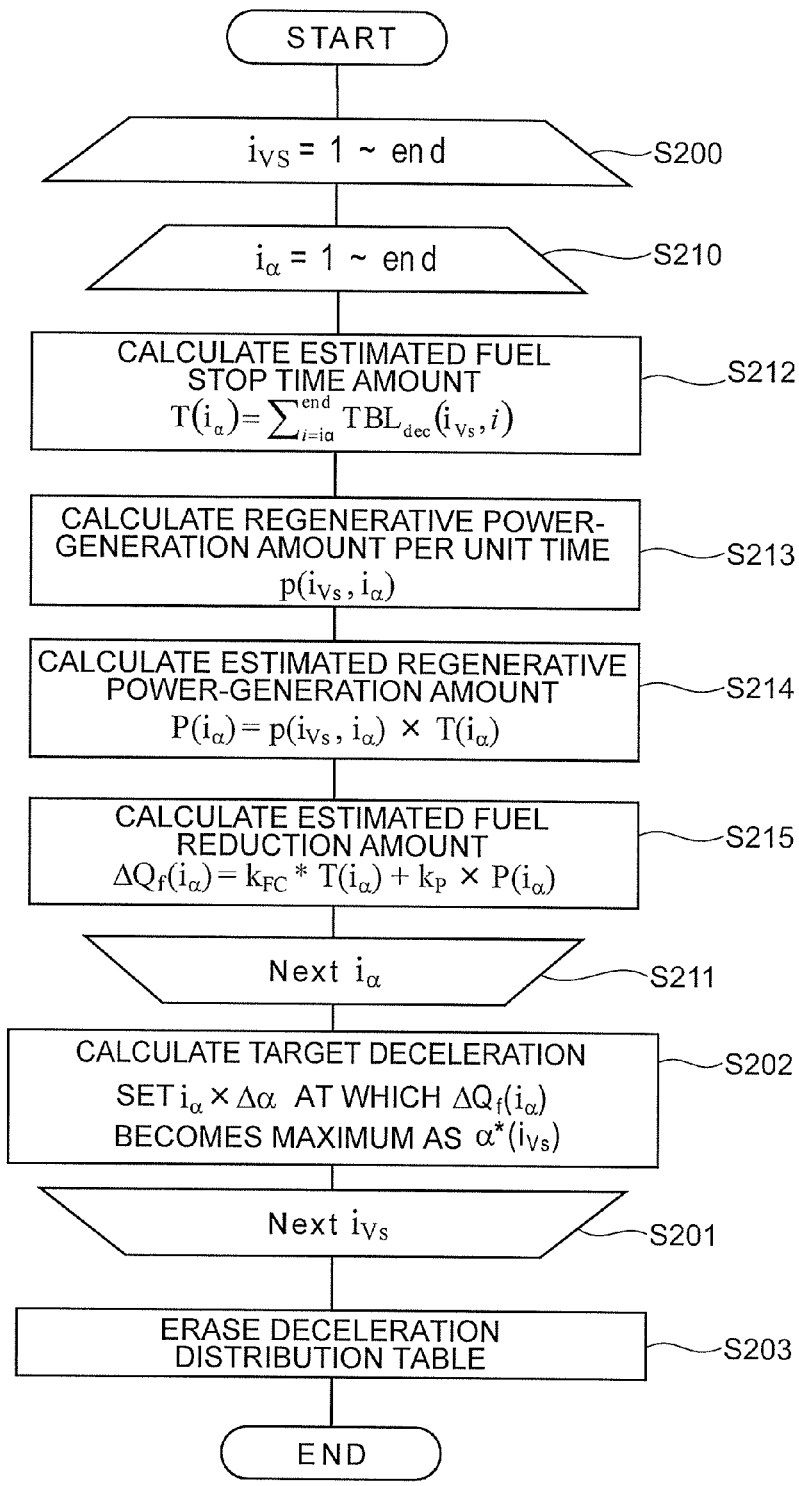
FIG. 8 is a flowchart illustrating processing for calculating the target deceleration map in the vehicle power-generator device according to the first embodiment of the present invention.

Hereinafter, a method of calculating the target deceleration map is described referring to FIG. 8. FIG. 8 is a flowchart illustrating processing for calculating the target deceleration map, which is performed in the target deceleration calculation means 101 provided in the vehicle power-generator device according to the first embodiment of the present invention. Timing at which the processing illustrated in FIG. 8 is performed is not limited. The processing is executed, for example, when the internal combustion engine 1 is stopped by an operation of an ignition switch after the running of the vehicle ends. In FIG. 8, first, in Step S200, processing up to Step S201 is repeatedly executed for the number of elements on the vehicle-speed axis of the deceleration distribution table $TBL_{dec}$. When the processing is terminated for all the elements which are targets of execution, the processing proceeds to Step S203. When the processing is not terminated, the processing proceeds to Step S210. At this time, a corresponding index on the vehicle-speed axis is $i_{Vs}$. It is described above that the processing is repeatedly executed for the number of elements on the vehicle-speed axis of the deceleration distribution table $TBL_{dec}$. However, a range on the vehicle-speed axis containing the above-mentioned elements only needs to be appropriately set to a normal vehicle-speed range, that is, from a 0 km per hour to 160 km per hour. For each vehicle speed within the thus determined predetermined range on the vehicle-speed axis (for each index $i_{Vs}$ indicating the vehicle-speed class), the processing from Steps S200 to S201 is repeatedly executed.

In Step S210, processing up to Step S211 is repeatedly executed for the number of elements on the deceleration axis of the deceleration distribution table $TBL_{dec}$. When the processing is terminated for all the elements which are targets of execution, the processing proceeds to Step S202. When the processing is not terminated, the processing proceeds to Step S212. At this time, a corresponding index on the deceleration axis is $i_α$. It is described above that the processing is repeatedly executed for the number of elements on the deceleration axis of the deceleration distribution table $TBL_{dec}$. However, a range on the deceleration axis containing the above-mentioned elements only needs to be appropriately set to the normal vehicle-speed range or the like. For each target deceleration sequentially set within the thus determined predetermined range on the deceleration axis (for each index $i_α$ indicating the deceleration class), the processing from Steps S210 to S211 is repeatedly executed.

In Step S212, an estimated fuel stop time amount $T(i_α)$ is calculated by Expression (7) described below from the deceleration distribution table $TBL_{dec}$. Then, the processing proceeds to Step S213.

[Math. 1]

$$T(i_α) = \Sigma_{i=i_α}^{end} TBL_{dec}(i_{Vs}, i) \qquad (7)$$

In Step S213, by the above-mentioned method of calculating the power-generation amount by the power generator 2 per unit time (see the characteristic map of the power generator 2 shown in FIG. 13), a regenerative power-generation amount $p(i_{Vs}, i_α)$ per unit time is calculated. Then, the processing proceeds to Step S214.

In Step S214, an estimated regenerative power-generation amount $P(i_α)$ is calculated by the multiplication of the estimated fuel stop time amount $T(i_α)$ calculated in Step S212 and the regenerative power-generation amount $p(i_{Vs}, i_α)$ per unit time, which is calculated in Step S213. Then, the processing proceeds to Step S215.

In Step S215, an estimated fuel reduction amount $ΔQf(i_α)$ is calculated by Expression (8) described below with the estimated fuel stop time amount $T(i_α)$ calculated in Step S212 and the estimated regenerative power-generation amount $P(i_α)$ calculated in Step S214. Then, the processing proceeds to Step S211.

$$ΔQf(i_α) = k_{FC} \times T(i_α) + k_P \times P(i_α) \qquad (8)$$

Here, in Expression (8), $k_{FC}$ is a fuel stop time amount evaluation coefficient, which is a coefficient indicating the effect of the fuel stop time amount on the fuel reduction amount. Moreover, $k_P$ is a power-generation amount evaluation coefficient, which is a coefficient indicating the effect of the regenerative power-generation amount on the fuel reduction amount.

In Step S211, when the processing in Steps S212 to S215 is not terminated for all the objective elements on the deceleration axis of the deceleration distribution table $TBL_{dec}$, the processing proceeds to Step S210 as repeated processing.

In Step S202, $i_α$ at which the estimated fuel reduction amount $ΔQf(i_α)$ calculated in Step S215 becomes maximum is extracted. The target deceleration indicated by the $i_α$ is set as the target deceleration at the vehicle speed indicated by $i_{Vs}$ on the target deceleration map. Then, the processing proceeds to Step S201. At this time, when all $ΔQf(i_α)$ are zero at the corresponding vehicle speed, that is, when the vehicle speed does not reach the corresponding vehicle speed during running or the like, processing for not changing the target deceleration with respect to the corresponding vehicle-speed axis or the like is added. In this manner, the target deceleration can be prevented from being unintentionally changed.

In Step S201, when the processing in Steps S210 to S202 is not terminated for all the objective elements on the vehicle-speed axis of the deceleration distribution table $TBL_{dec}$, the processing proceeds to that in Step S200 as repeated processing.

In Step S203, the used values of the deceleration distribution table $TBL_{dec}$ are erased. Then, the current processing series is terminated.

In the above-mentioned manner, the target deceleration map used in the target deceleration calculation means 101 illustrated in FIG. 1 can be obtained.

As described above, the vehicle power-generator device according to the first embodiment of the present invention is to be mounted in the vehicle, the vehicle including: the internal combustion engine 1 as the power source for the vehicle; the power generator (rotary electric machine) 2 for transmitting and receiving the power to/from the internal combustion engine, the power generator being capable of variably controlling the power-generation amount by the command power-generation amount (command Duty) to be input to the power generator; and the transmission 3 for transmitting the power of the internal combustion engine 1 and the power generator 2 to the drive shaft of the vehicle, the vehicle power-generator device including: the rotation-speed detection means 23 for detecting the rotation speed of the power generator 2; the output-voltage acquisition means 24 for detecting the output voltage of the power generator 2; the transmission-gear-ratio detection means 22 for detecting the transmission gear ratio of the transmission 3; the vehicle-speed detection means 21 for detecting the vehicle speed of the vehicle; and the control device 10 for inputting the command power-generation amount (command Duty) to the power generator 2. The control device 10 includes: the target deceleration calculation means 101 for calculating the target deceleration in accordance with the vehicle speed detected by the vehicle-speed detection means 21 by using the target deceleration map in which the target deceleration is set for each vehicle; the command power-generation torque calculation means 102 for calculating the command power-generation torque based on the target deceleration calculated by the target deceleration calculation means 101, the rotation speed detected by the rotation-speed detection means 23, and the transmission gear ratio detected by the transmission-gear-ratio detection means 22; and the command power-generation amount calculation means 103 for calculating the command power-generation amount (command Duty) to be input to the power generator 2 based on the command power-generation torque calculated by the command power-generation torque calculation means 102, the rotation speed detected by the rotation-speed detection means 23, and the output voltage detected by the output-voltage acquisition means 24. Note that, the target deceleration map is calculated based on the vehicle-speed shift in accordance with the actual running condition of the vehicle, the actual running condition being detected by the vehicle-speed detection means 21 under deceleration with the fuel stop for the vehicle. With the above-mentioned configuration, the target deceleration can be set for each vehicle speed so that the regenerative power-generation amount is set so as to achieve the target deceleration. As a result, the target deceleration map is updated so as to meet the tendency of the speed shift while the driver is driving for each individual vehicle. In this manner, the regenerative power generation can be performed so that the fuel reduction effect becomes optimal.

In addition, the target deceleration calculation means 101 includes: deceleration determination means (S100, FIG. 7) for determining whether or not the vehicle is decelerating based on the vehicle speed detected by the vehicle-speed detection means 21; fuel stop determination means (S101, FIG. 7) for determining whether or not the vehicle is in the fuel stopped state when it is determined by the deceleration determination means that the vehicle is decelerating; deceleration detection means (S110, FIG. 7) for detecting the deceleration of the vehicle based on the vehicle speed detected by the vehicle-speed detection means 21 when it is determined by the fuel stop determination means that the vehicle is in the fuel stopped state; deceleration distribution calculation means (S111 and S112, FIG. 7) for calculating, based on the vehicle speed detected by the vehicle-speed detection means 21 and the deceleration detected by the deceleration detection means, a deceleration distribution by adding up a frequency at which the detected deceleration is achieved for each vehicle speed; fuel stop time amount estimation means (S212, FIG. 8) for calculating an estimated fuel stop time amount for each target deceleration sequentially set within the predetermined range based on the deceleration distribution; regenerative power-generation amount estimation means (S213 and S214, FIG. 8) for calculating the estimated regenerative power-generation amount by calculating the regenerative power-generation amount per unit time based on the rotation speed of the power generator 2 and the power-generation torque and multiplying the regenerative power-generation amount per unit time by the estimated fuel stop time amount; fuel reduction amount calculation means (S215, FIG. 8) for calculating the estimated fuel reduction amount by using the fuel stop time amount evaluation coefficient and the power-generation amount evaluation coefficient based on the estimated fuel stop time amount and the estimated regenerative power-generation amount; and target deceleration map calculation means (S202, FIG. 8) for calculating the target deceleration map by setting the value of the target deceleration at which the estimated fuel reduction amount becomes maximum among the estimated fuel reduction amounts calculated by the fuel reduction amount calculation means for each target deceleration sequentially set within the predetermined range as the target deceleration for each vehicle speed. Therefore, the target deceleration can be set for each vehicle speed so that the regenerative power-generation amount is set so as to achieve the target deceleration. In this manner, the target deceleration map is updated so as to meet the tendency of the speed shift while the driver is driving for each individual vehicle. As a result, the regenerative power generation can be performed so that the fuel reduction effect becomes optimal.

Second Embodiment

In the vehicle power-generator device according to the first embodiment described above, the estimated fuel reduction amount $\Delta Qf$ is calculated for all the elements on the deceleration axis so as to calculate the target deceleration at which the estimated fuel reduction amount $\Delta Qf$ becomes maximum. In a vehicle power-generator device according to a second embodiment of the present invention, the estimated fuel reduction amount $\Delta Qf$ is calculated only for the currently set target deceleration and the deceleration in the vicinity thereof to reduce computation processing. At the same time, the target deceleration map is gradually updated so that the fuel reduction amount by the regenerative power generation becomes larger.

Figure 9:
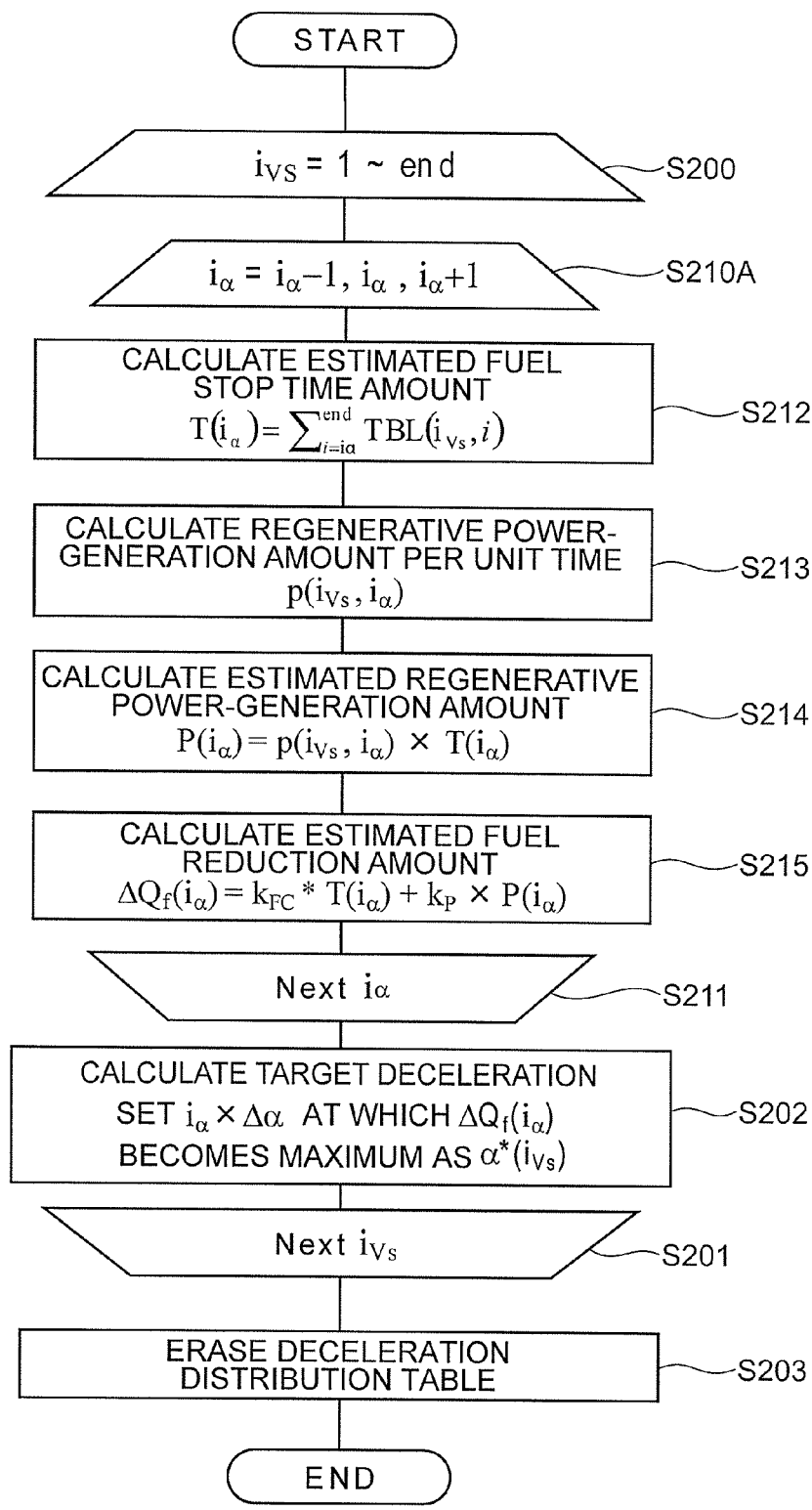
FIG. 9 is a flowchart illustrating processing for calculating the target deceleration map in a vehicle power-generator device according to a second embodiment of the present invention.

FIG. 9 is a flowchart illustrating processing for calculating the target deceleration map in the vehicle power-generator device according to the second embodiment of the present invention. Parts corresponding to those of the flowchart illustrated in FIG. 8 of the first embodiment described above are denoted by the same reference symbols, and processing of a different part (specifically, Step S210A) is mainly described below.

In FIG. 9, in Step S200, processing up to the processing in Step S201 is repeatedly executed for the number of elements on the vehicle-speed axis of the deceleration distribution table $TBL_{dec}$. Individual processing is basically the same as that of the first embodiment. When the processing is terminated for all the objective elements, the processing proceeds to Step S203. When the processing is not terminated, the processing proceeds to Step S210A. At this time, a corresponding index on the vehicle-speed axis is denoted by $i_{Vs}$.

In Step S210A, the processing up to the processing in Step S211 is repeatedly executed for an element ($i_\alpha$) indicating the current target deceleration on the deceleration axis of the deceleration distribution table $TBL_{dec}$ and elements just before and after the element ($i_\alpha-1$ and $i_\alpha+1$). When the processing is terminated for all the objective elements ($i_\alpha-1$, $i_\alpha$, and $i_\alpha+1$), the processing proceeds to Step S202. When the processing is not terminated, the processing proceeds to Step S212. At this time, a corresponding index on the deceleration axis is $i_\alpha$. The processing in Step S212 and later is not limited to be executed for the elements just before and after the element indicating the current target deceleration, and can also be executed for a plurality of previous and next elements, (for example, two previous and next elements for each ($i_\alpha-2$, $i_\alpha-1$, $i_\alpha$, $i_\alpha+1$, and $i_\alpha+2$) or three previous and next elements for each ($i_\alpha-3$, $i_\alpha-2$, $i_\alpha-1$, $i_\alpha$, $i_\alpha+1$, $i_\alpha+2$, and $i_\alpha+3$) and the like).

In Step S211, the processing proceeds to Step S210A as the repeated processing.

Processing in Steps S202, S201, and S203 is the same as that in Steps S202, S201, and S203 of the first embodiment. Therefore, the description thereof is herein omitted.

As described above, according to the vehicle power-generator device of the second embodiment of the present invention, the same effects as those obtained by the first embodiment described above are obtained. Further, in this embodiment, the estimated fuel reduction amount $\Delta Qf$ is calculated only for the currently set target deceleration and the deceleration in the vicinity thereof. Therefore, the deceleration becomes gradually closer to the target deceleration at which the fuel reduction amount by the regenerative power generation becomes larger. However, a change amount between the target deceleration at the time of previous running and the target deceleration at the time of current running does not become large. Thus, a feeling of discomfort given to the driver can be reduced. Moreover, by calculating the estimated fuel reduction amount $\Delta Qf$ only for the deceleration in the vicinity of the currently set target deceleration, a necessary computation amount is reduced. As a result, the processing for calculating the target deceleration map can be reduced.

Third Embodiment

In the vehicle power-generator device according to the second embodiment described above, the deceleration which are calculated at the time of deceleration with the fuel stop are all added up for the deceleration distribution. In a vehicle power-generator device according to a third embodiment of the present invention, on the other hand, even at the time of deceleration with the fuel stop, the deceleration during the deceleration is not calculated when the deceleration greatly increases, thereby preventing the deceleration distribution from being affected. In this manner, the target deceleration is prevented from being set excessively large under the effects of the deceleration at the time of panic braking or the like.

Figure 10:
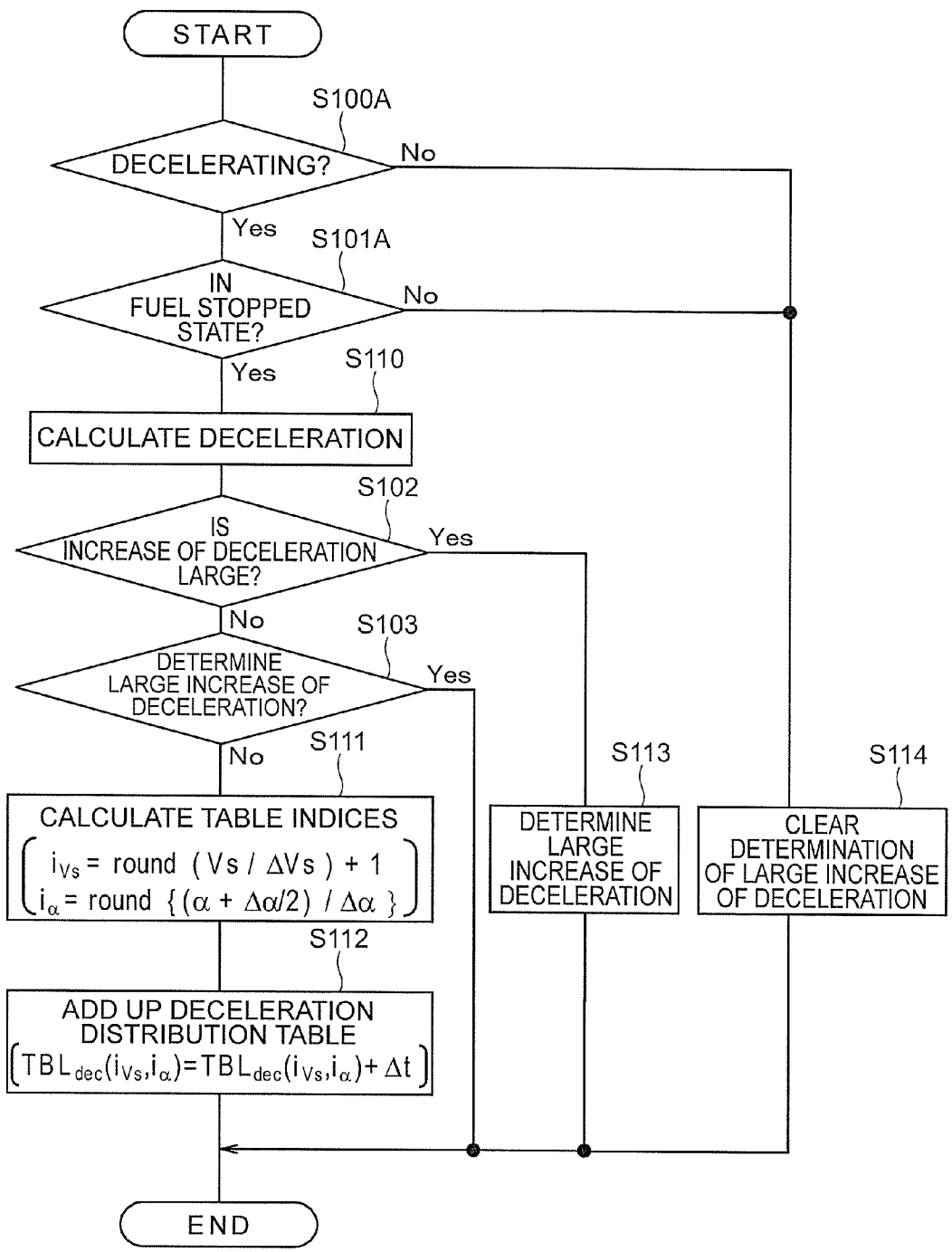
FIG. 10 is a flowchart illustrating processing for obtaining the deceleration distribution in a vehicle power-generator device according to a third embodiment of the present invention.

FIG. 10 is a flowchart illustrating processing for calculating the target deceleration map in the vehicle power-generator device according to the third embodiment of the present invention. Parts corresponding to those of the flowchart of FIG. 7 according to the first embodiment described above are denoted by the same reference symbols. Differences from the flow of FIG. 7 lie in that Steps S100A and S101A are respectively provided in FIG. 10 in place of Steps S100 and S101 of FIG. 7, and that Steps S102, S103, S113, and S114 are added in FIG. 10. In the following description, processing of the parts different from those of FIG. 7 is mainly described.

In Step S100A, whether or not the vehicle is decelerating is determined based on the vehicle speed Vs. When the vehicle is decelerating, the processing proceeds to Step S101A. When the vehicle is not decelerating, the processing proceeds to Step S114.

In Step S101A, whether or not the fuel is in a stopped state for deceleration. When the fuel is in the stopped state, the processing proceeds to Step S110. When the fuel is not in the stopped state, the processing proceeds to Step S114.

In Step S110, the deceleration $\alpha$ of the vehicle is calculated based on the change amount of the vehicle speed Vs. Then, the processing proceeds to Step S102.

In Step S102, when the change amount between the deceleration $\alpha$ obtained in Step S110 and the previous deceleration is equal to or larger than a predetermined value as a result of comparison therebetween, the processing proceeds to Step S113. Otherwise, the processing proceeds to Step S103.

In Step S103, when a determination of a large increase in the deceleration is not set, the processing proceeds to Step S111. When the determination of a large increase in the deceleration is set, the current processing is terminated.

In Step S113, the determination of a large increase in the deceleration is set. Then, the current processing is terminated.

In Step S114, the determination of a large increase in the deceleration is cleared. Then, the current processing is terminated.

The remaining processing is the same as that in the vehicle power-generator device according to the second embodiment described above.

As described above, according to the vehicle power-generator device according to the third embodiment of the present invention, the same effects as those of the first embodiment described above are obtained. Further, in this embodiment, in the case where the change amount of the deceleration becomes equal to or larger than the predetermined value when it is determined that the fuel is in the stopped state, the deceleration distribution is not calculated. Therefore, for example, even when there is an abrupt increase in the deceleration due to a factor such as panic braking, the target deceleration can be prevented from being set excessively large due to the deceleration.

Fourth Embodiment

In the vehicle power-generator device according to the third embodiment described above, the target deceleration map is formed for each vehicle. In a vehicle power-generator device according to a fourth embodiment of the present invention, on the other hand, the target deceleration map is calculated for each driver based on driver identification information acquired by driver identification means (not shown) for identifying a driver.

For example, for a vehicle having a function of selecting and switching a driving position of a driver's seat by a switching operation or the like for a plurality of drivers, the driver identification means only needs to identify a driver by using the above-mentioned function. Specifically, the target deceleration map is formed for each driving position corresponding to each driver. When the driver moves the driving position by the switching operation, the driver is identified so that the target deceleration map corresponding to the driving position selected by the switching operation is used. The driver identification means is not limited to the example described above. For example, an IC card reader may be provided to a vehicle to read information of an IC card carried by each individual driver so that the driver is identified. Alternatively, a driver may use a car navigation device and input a unique identification number (ID) or a password on an operation screen of the device so that the driver is identified. Further alternatively, a driver may be identified by biometric authentication.

As described above, according to the vehicle power-generator device of the fourth embodiment of the present invention, the same effects as those of the first embodiment described above are obtained. Further, in this embodiment, the driver identification means for identifying the drivers of the vehicle is provided so that the target deceleration map is individually calculated for each driver based on the result of identification of the driver by the driver identification means. Therefore, even when a plurality of drivers drive the same vehicle, the regenerative power-generation amount which provides an optimal fuel reduction amount for each driver can be set.

Fifth Embodiment

For the vehicle power-generator devices up to the fourth embodiment described above, the fuel stop time amount evaluation coefficient $k_{FC}$ and the power-generation amount evaluation coefficient $k_p$ are set to constant values, respectively. In a vehicle power-generator device according to a fifth embodiment of the present invention, the fuel stop time amount evaluation coefficient $k_{FC}$ is obtained from a fuel injection amount under no load for the vehicle, whereas the power-generation amount evaluation coefficient $k_p$ is obtained from the power-generation amount at the time of power generation with the use of the fuel and an amount of increase in the used fuel amount.

Figure 11:
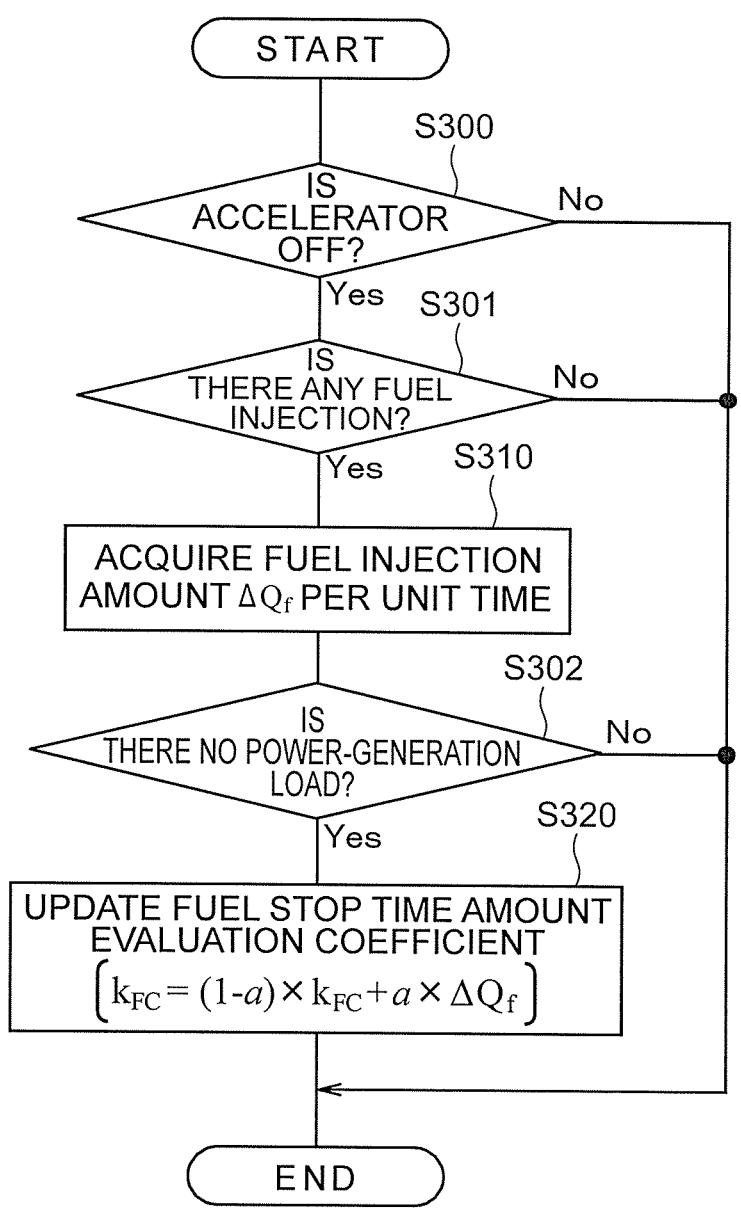
FIG. 11 is a flowchart illustrating processing for calculating a fuel stop time amount evaluation coefficient in a vehicle power-generator device according to a fifth embodiment of the present invention.

FIG. 11 is a flowchart illustrating processing for calculating the fuel stop time amount evaluation coefficient $k_{FC}$, which is executed at predetermined time intervals while the internal combustion engine is being driven. In FIG. 11, first, in Step S300, whether or not there is an input of the accelerator pedal is determined. When there is the input of the accelerator pedal, the current processing is terminated. When there is no input of the accelerator pedal, the processing proceeds to Step S301.

In Step S301, whether or not the fuel is injected is determined. When the fuel is not injected, the current processing is terminated. When the fuel is injected, the processing proceeds to Step S310.

In Step S310, a fuel injection amount ΔQf per unit time is calculated from the fuel injection amount acquired by fuel injection amount acquisition means (not shown). Then, the processing proceeds to Step S302.

In Step S302, whether or not the power is generated by the power generator 2 is determined. When the power is generated, the current processing is terminated. When the power is not generated, the processing proceeds to Step S320.

In Step S320, the fuel stop time amount evaluation coefficient $k_{FC}$ is updated by Expression (9) described below. Then, the current processing is terminated.

$$k_{FC}=(1-a)k_{FC}+a\times\Delta Qf \quad (9)$$

Here, a indicates a filter constant.

Figure 12:
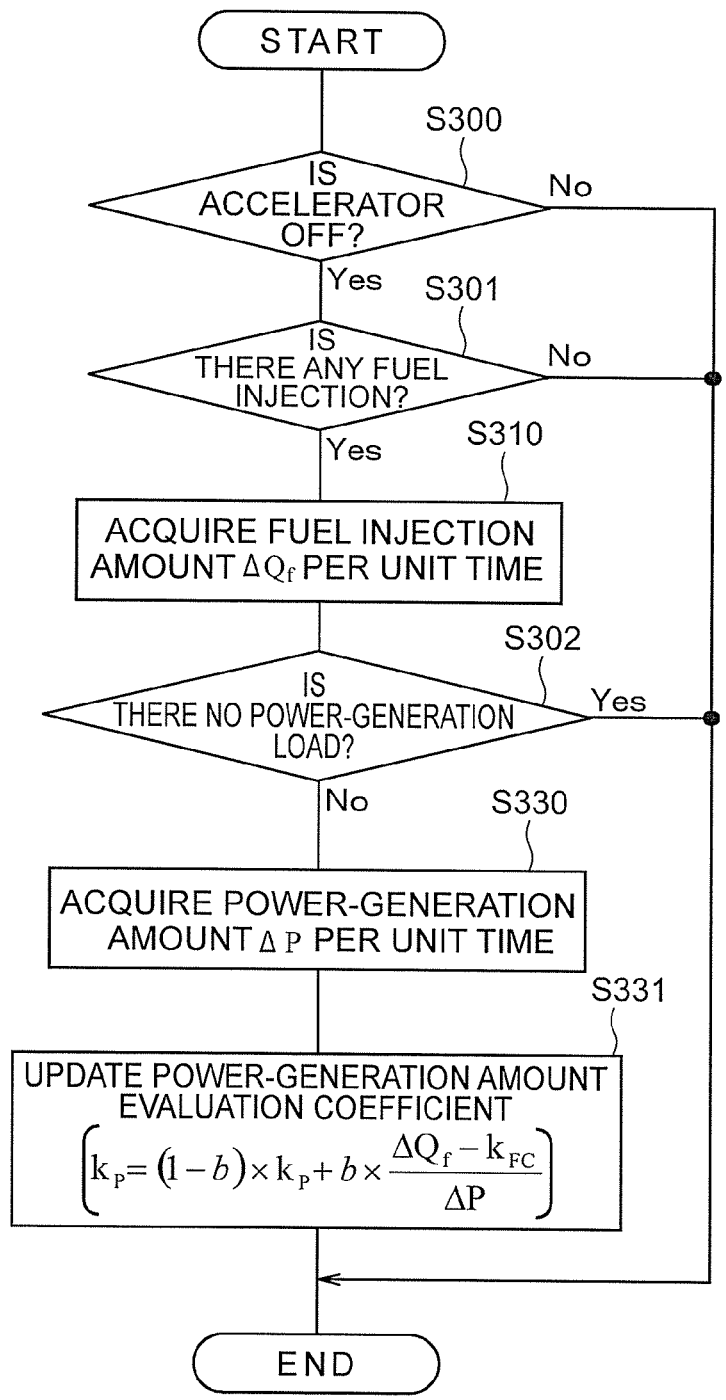
FIG. 12 is a flowchart illustrating processing for calculating a power-generation amount evaluation coefficient in the vehicle power-generator device according to the fifth embodiment of the present invention.

FIG. 12 is a flowchart illustrating processing for calculating the power-generation amount evaluation coefficient $k_p$, which is executed at predetermined time intervals while the internal combustion engine is being driven. In FIG. 12, first, in Step S300, whether or not there is an input of the accelerator pedal is determined. When there is the input of the accelerator pedal, the current processing is terminated. When there is no input of the accelerator pedal, the processing proceeds to Step S301.

In Step S301, whether or not the fuel is injected is determined. When the fuel is not injected, the current processing is terminated. When the fuel is injected, the processing proceeds to Step S310.

In Step S310, the fuel injection amount ΔQf per unit time is calculated from the fuel injection amount acquired by the fuel injection amount acquisition means (not shown). Then, the processing proceeds to Step S302.

In Step S302, whether or not the power is generated by the power generator 2 is determined. When the power is not generated, the current processing is terminated. When the power is generated, the processing proceeds to Step S330.

In Step S330, the power-generation amount ΔP per unit time is acquired from the power-generation amount by the power generator 2 acquired by power-generation amount acquisition means (not shown). Then, the processing proceeds to Step S331.

In Step S331, the power-generation amount evaluation coefficient $k_P$ is updated by Expression (10) described below. Then, the current processing is terminated.

[Math. 2]

$$k_P = (1-b)\times k_P + b\times \frac{\Delta Q_f - k_{FC}}{\Delta P} \quad (10)$$

Here, b indicates a filter constant.

As described above, according to the vehicle power-generator device of the fifth embodiment of the present invention, the effects as those of the first embodiment described above are obtained. Further, in this embodiment, the fuel stop time amount evaluation coefficient $k_{FC}$ is calculated based on the fuel injection amount when there is no operation of the accelerator pedal, whereas the power-generation amount evaluation coefficient $k_p$ is calculated based on the power-generation amount by the power generator 2 and the fuel injection amount when there is no operation of the accelerator pedal. In this manner, the fuel stop time amount evaluation coefficient $k_{FC}$ and the power-generation amount evaluation coefficient $k_p$ are updated so as to meet the characteristics of the vehicle. As a result, the target deceleration map which is optimal even for a fluctuation factor (environmental change) such as a variation between devices, a difference in climate, a difference in fuel composition, and degradation of lubricating oil. As a result, the regenerative power-generation amount which provides optimal fuel reduction effects by the regenerative power generation can be set.

Sixth Embodiment

In a vehicle power-generator device according to a sixth embodiment of the present invention, a target deceleration map obtained from a previously defined deceleration distribution is set as an initial value.

Figure 14:
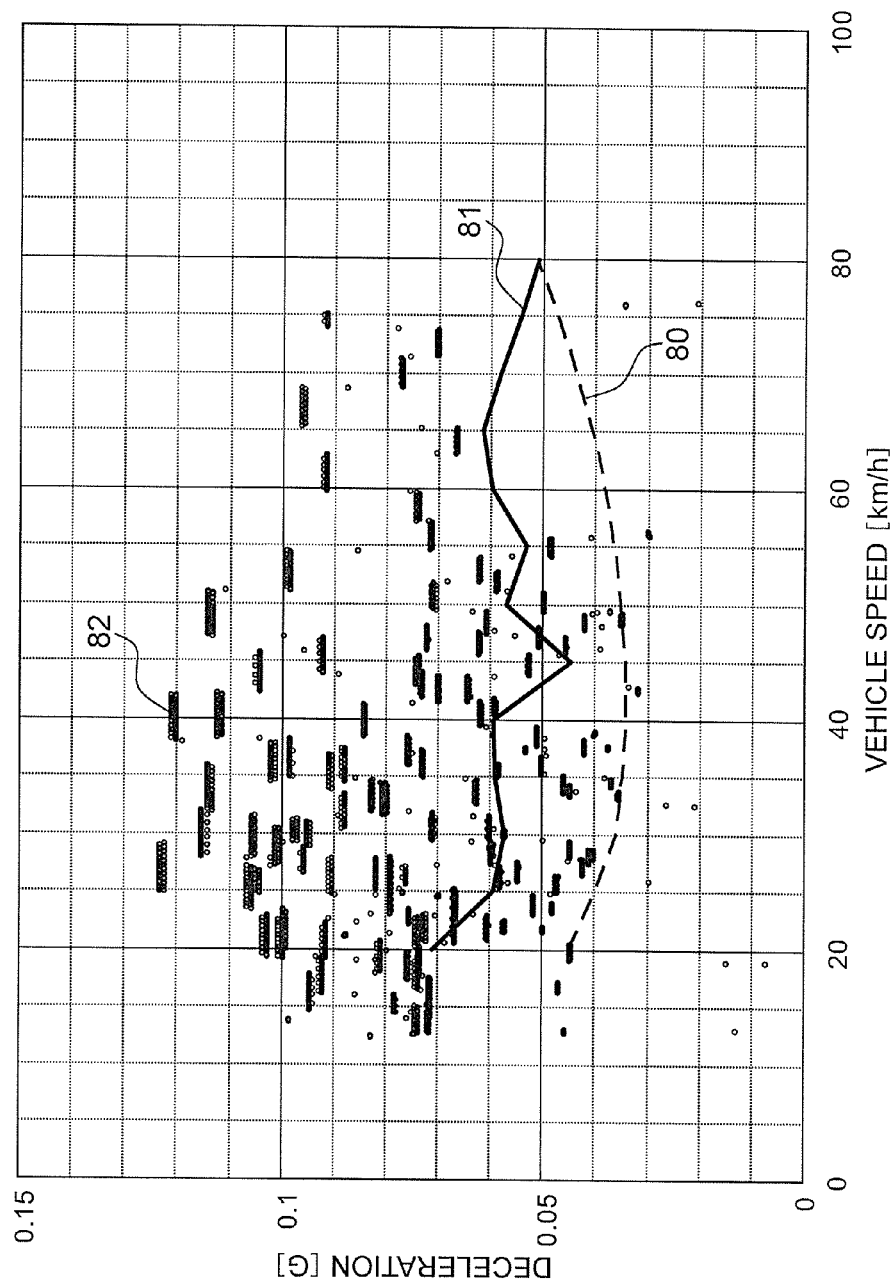
FIG. 14 is a graph showing an example of a deceleration target deceleration map set as an initial value and the deceleration distribution in a vehicle power-generator device according to a sixth embodiment of the present invention.

FIG. 14 is a graph showing an example of a target deceleration map set as the initial value and the deceleration distribution in the vehicle power-generator device according to the sixth embodiment. In FIG. 14, a horizontal axis indicates the vehicle speed, whereas a vertical axis indicates the deceleration. A broken line 80 indicates a deceleration shift of the vehicle when there is no power generation, a solid line 81 indicates a calculated target deceleration map, and outlined circles 82 indicate a deceleration distribution with respect to the vehicle speed. The target deceleration map indicated by the solid line 81 is calculated in the same manner as in the first embodiment based on the deceleration distribution indicated by the outlined circles 82. The deceleration distribution set in this case is suitably set based on a running pattern in consideration of characteristics of driving tendency in each region, for example, a low-speed running time period is long in Japan because of many traffic jams, whereas high-speed running on the autobahn is frequent in Germany.

As described above, according to the vehicle power-generator device of the sixth embodiment of the present invention, the same effects as those of the first embodiment described above are obtained. Further, in this embodiment, as the target deceleration map used in the target deceleration calculation means 101, the target deceleration map obtained from the preset deceleration distribution is set as the initial value. Therefore, even immediately after the start of use of the vehicle or in the case of erasure of an internal memory, the regenerative power-generation amount which provides the fuel reduction effects optimal for a supposed typical running pattern can be set.

REFERENCE SIGNS LIST

1 internal combustion engine, 2 power generator, 3 transmission, 10 control device, 21 vehicle-speed detection means, 22 transmission-gear-ratio acquisition means, 23 power-generator rotation-speed acquisition means, 24 power-generator output-voltage acquisition means, 101 target deceleration calculation means, 102 command power-generation torque calculation means, 103 command Duty calculation means, 110 means for determining fuel stop during deceleration

The invention claimed is:

1. A vehicle power-generator device to be mounted in a vehicle,
the vehicle comprising: an internal combustion engine as a power source for the vehicle; a rotary electric machine for transmitting and receiving power to/from the internal combustion engine, the rotary electric machine being capable of variably controlling a power-generation amount by a command power-generation amount to be input to the rotary electric machine; and a transmission for transmitting the power of the internal combustion engine and the rotary electric machine to a drive shaft of the vehicle,
the vehicle power-generator device comprising:
a rotation-speed detector for detecting a rotation speed of the rotary electric machine;
an output-voltage detector for detecting an output voltage of the rotary electric machine;
a transmission-gear-ratio detector for detecting a transmission gear ratio of the transmission;
a vehicle-speed detector for detecting a vehicle speed of the vehicle; and
a control device for inputting the command power-generation amount to the rotary electric machine,
wherein the control device comprises:
a target deceleration calculator for calculating a target deceleration in accordance with the vehicle speed detected by the vehicle-speed detector by using a target deceleration map in which the target deceleration is set for each vehicle;
a command power-generation torque calculator for calculating a command power-generation torque based on the target deceleration calculated by the target deceleration calculator, the rotation speed detected by the rotation-speed detector, and the transmission gear ratio detected by the transmission-gear-ratio detector; and
a command power-generation amount calculator for calculating the command power-generation amount to be input to the rotary electric machine based on the command power-generation torque calculated by the command power-generation torque calculator, the rotation speed detected by the rotation-speed detector, and the output voltage detected by the output-voltage detector, and
wherein the target deceleration map is calculated based on a vehicle-speed shift in accordance with an actual running condition of the vehicle, the actual running condition being detected by the vehicle-speed detector under deceleration with fuel stop for the vehicle.

2. The vehicle power-generator device according to claim 1, wherein, based on the vehicle speed detected by the vehicle-speed detector and a deceleration obtained from the vehicle speed while the vehicle is decelerating with the fuel stop, the target deceleration map is calculated by calculating a deceleration distribution by adding up a frequency at which the obtained deceleration is achieved for each vehicle speed, calculating an estimated fuel reduction amount based on the deceleration distribution, and setting the deceleration at which the estimated fuel reduction amount becomes maximum as the target deceleration for each vehicle speed.

3. The vehicle power-generator device according to claim 1, wherein the target deceleration calculator comprises:
a deceleration determiner for determining whether or not the vehicle is decelerating based on the vehicle speed detected by the vehicle-speed detector;
a fuel stop determiner for determining whether or not the vehicle is in a fuel stopped state when it is determined by the deceleration determiner that the vehicle is decelerating;
a deceleration determiner for detecting the deceleration of the vehicle based on the vehicle speed detected by the vehicle-speed detector when it is determined by the fuel stop determiner that the vehicle is in the fuel stopped state;
a deceleration distribution calculator for calculating, based on the vehicle speed detected by the vehicle-speed detector and the deceleration detected by the deceleration detector, a deceleration distribution by adding up a frequency at which the detected deceleration is achieved for each vehicle speed;
a fuel stop time amount calculator for calculating an estimated fuel stop time amount for each target deceleration sequentially set within a predetermined range based on the deceleration distribution;
a regenerative power-generation amount calculator for calculating an estimated regenerative power-generation amount by calculating a regenerative power-generation amount per unit time based on the rotation speed of the rotary electric machine and a power-generation torque and multiplying the regenerative power-generation amount per unit time by the estimated fuel stop time amount;
a fuel reduction amount calculator for calculating an estimated fuel reduction amount by using a fuel stop time amount evaluation coefficient and a power-generation amount evaluation coefficient based on the estimated fuel stop time amount and the estimated regenerative power-generation amount; and
a target deceleration map calculator for calculating the target deceleration map by setting a value of the target deceleration at which the estimated fuel reduction amount becomes maximum among the estimated fuel reduction amounts calculated by the fuel reduction amount calculator for each target deceleration sequentially set within the predetermined range as a target deceleration for each vehicle speed.

4. The vehicle power-generator device according to claim 3, wherein the predetermined range of the target deceleration comprises a currently set target deceleration and previous and next predetermined values.

5. The vehicle power-generator device according to claim 3, wherein, in a case where a change amount of the deceleration becomes equal to or larger than a predetermined value when it is determined by the fuel stop determiner that the vehicle is in the fuel stopped state, the calculation of the deceleration distribution is avoided.

6. The vehicle power-generator device according to claim 3, further comprising a driver identification detector for identifying a driver of the vehicle,
wherein the target deceleration map is individually calculated for each driver based on a result of the identification of the driver by the driver identification detector.

7. The vehicle power-generator device according to claim 3, further comprising:
an accelerator-pedal operation detector for detecting whether or not an accelerator pedal is operated by a driver;
a fuel injection amount detector for acquiring a fuel injection amount to the internal combustion engine; and
a power-generation amount detector for acquiring the power-generation amount by the rotary electric machine,
wherein the fuel stop time amount evaluation coefficient is calculated based on the fuel injection amount acquired when it is determined that the accelerator pedal is not operated, and
wherein the power-generation amount evaluation coefficient is calculated based on the power-generation amount by the rotary electric machine and the fuel injection amount acquired when it is determined that the accelerator pedal is not operated.

8. The vehicle power-generator device according to claim 1, wherein, for the target deceleration map to be used by the target deceleration calculator, a target deceleration map obtained from a predetermined deceleration distribution is set as an initial value.

9. A vehicle power-generation control method to be executed in a vehicle,
the vehicle comprising: an internal combustion engine as a power source for the vehicle; a rotary electric machine for transmitting and receiving power to/from the internal combustion engine, the rotary electric machine being capable of variably controlling a power-generation amount by a command power-generation amount to be input to the rotary electric machine; and a transmission for transmitting the power of the internal combustion engine and the rotary electric machine to a drive shaft of the vehicle,
the vehicle power-generation control method comprising:
detecting a rotation speed of the rotary electric machine;
detecting an output voltage of the rotary electric machine;
detecting a transmission gear ratio of the transmission;
detecting a vehicle speed of the vehicle;
calculating, based on the detected vehicle-speed and a deceleration obtained from the vehicle speed while the vehicle is decelerating with fuel stop, a target deceleration map in which a target deceleration for each vehicle speed is set based on a deceleration distribution, the deceleration distribution being calculated by adding up a frequency at which the obtained deceleration is achieved for each of the vehicle speeds;
calculating a target deceleration in accordance with the detected vehicle speed by using the target deceleration map;
calculating a command power-generation torque based on the calculated target deceleration, the detected rotation speed, and the detected transmission gear ratio;
calculating the command power-generation amount to be input to the rotary electric machine based on the calculated command power-generation torque, the detected rotation speed, and the detected output voltage; and
controlling the power-generation amount by the rotary electric machine by inputting the calculated command power-generation amount to the rotary electric machine.

* * * * *